United States Patent
Zhang et al.

(10) Patent No.: US 11,570,084 B2
(45) Date of Patent: Jan. 31, 2023

(54) PATH ROUTING WITH DELAY CONSTRAINTS

(71) Applicant: FUJITSU LIMITED, Kawasaki (JP)

(72) Inventors: Qiong Zhang, Plano, TX (US); Virgil Vladescu, Hillsdale, NJ (US); Paparao Palacharla, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/334,759

(22) Filed: May 30, 2021

(65) Prior Publication Data

US 2022/0385567 A1    Dec. 1, 2022

(51) Int. Cl.
*H04L 45/12* (2022.01)
*H04L 45/24* (2022.01)
*H04L 45/302* (2022.01)
*H04L 45/02* (2022.01)
*H04L 45/00* (2022.01)

(52) U.S. Cl.
CPC ............ *H04L 45/123* (2013.01); *H04L 45/02* (2013.01); *H04L 45/22* (2013.01); *H04L 45/24* (2013.01); *H04L 45/302* (2013.01)

(58) Field of Classification Search
CPC ....... H04L 45/123; H04L 45/22; H04L 45/24; H04L 45/302
See application file for complete search history.

(56) References Cited

U.S. PATENT DOCUMENTS

| | | | | |
|---|---|---|---|---|
| 7,643,426 B1* | 1/2010 | Lee | ........................ | H04L 45/02 370/238 |
| 2001/0029543 A1* | 10/2001 | Iwata | ...................... | H04L 45/00 709/233 |
| 2011/0170416 A1* | 7/2011 | Schwager | ............... | H04L 45/00 370/238 |
| 2017/0346720 A1* | 11/2017 | Lazzeri | ................... | H04L 45/20 |

* cited by examiner

*Primary Examiner* — Abdulkader M Alriyashi
(74) *Attorney, Agent, or Firm* — Maschoff Brennan

(57) ABSTRACT

An example method may include obtaining network information of a network and determining a second path from a first node of multiple nodes to a second node of the multiple nodes. The network information may include a network topology that may include the multiple nodes and multiple links connecting the multiple nodes. The multiple links may include a first routing metric and a second routing metric. The network information may also include multiple first paths from each node of the multiple nodes to all other nodes of the multiple nodes along the multiple links. The multiple first paths may be determined based on the first routing metric. The determining the second path may include selecting path segments for the second path along the multiple links based on the path segments being included in the multiple first paths based on the second routing metric of the multiple links included in the path segments.

16 Claims, 7 Drawing Sheets

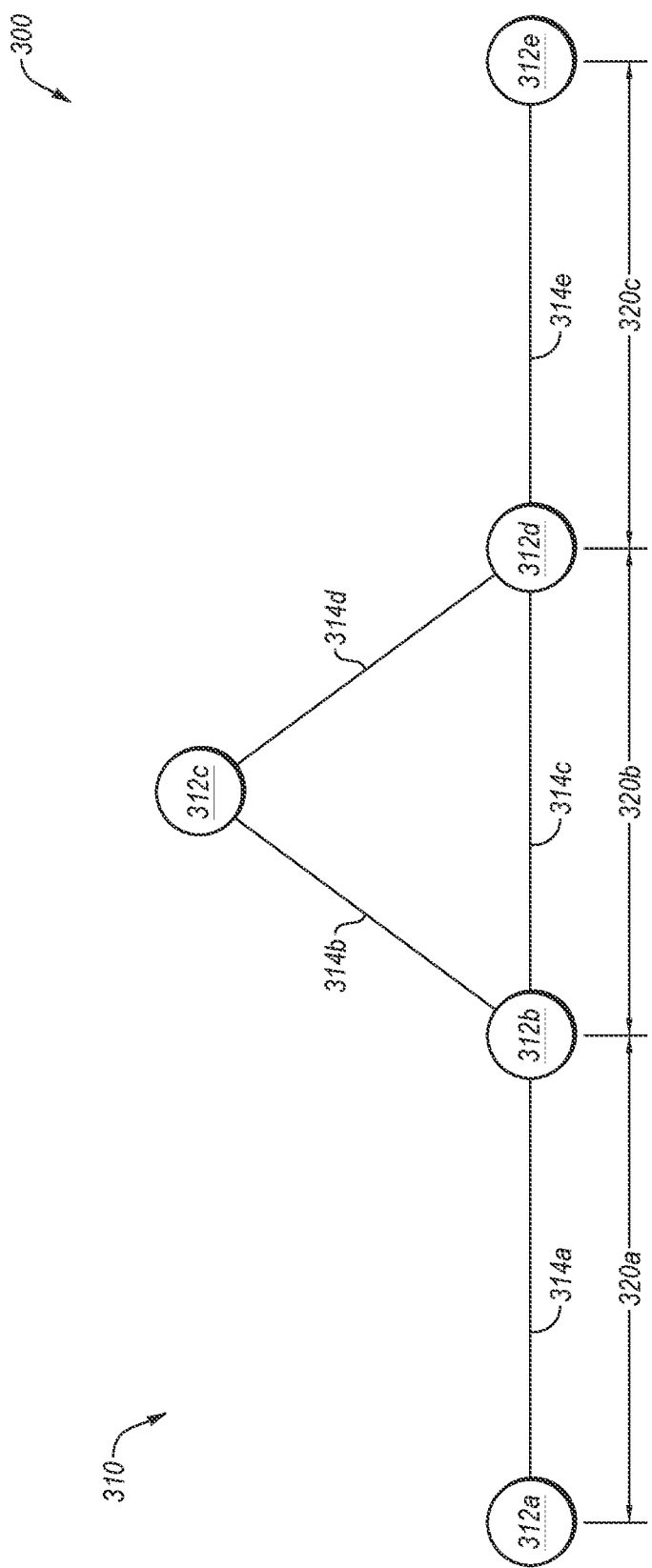

PATH ROUTING WITH DELAY CONSTRAINTS

The embodiments discussed in the present disclosure are related to path routing with delay constraints.

BACKGROUND

Data transmitted between devices may including routing along various paths between the devices. Some paths may include one or more segments between system elements. The system elements that may be used to move data between devices may include routers and/or switches. For example, data may be transmitted from a first device to a second device through a series of routers with each router including instructions to forward the data to the next router until the data reaches the second device.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an embodiment, a method may include obtaining network information of a network and determining a second path from a first node of multiple nodes to a second node of the multiple nodes. The network information may include a network topology that may include the multiple nodes and multiple links connecting the multiple nodes. The multiple links may include a first routing metric and a second routing metric. The network information may also include multiple first paths from each node of the multiple nodes to all other nodes of the multiple nodes along the multiple links. The multiple first paths may be determined based on the first routing metric. The determining the second path may include selecting path segments for the second path along the multiple links based on the path segments being included in the multiple first paths based on the second routing metric of the multiple links included in the path segments.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates an example visualization of a transmission delay calculation;

DESCRIPTION OF EMBODIMENTS

Path routing of data from a source to a destination contributes to ensuring delivery of the data, and that the data is delivered in a particular time frame. Path routing may include determining characteristics of the routing network, such as a number of routers and/or switches between the source and the destination and the nature of the network links between the routers and/or switches, that may contribute to the delivery of data within particular parameters. In some circumstances, a single route from the source to the destination may become congested, slowed, and/or otherwise degraded such that it may be beneficial to use a different route to maintain delivery of data between the source and the destination within the particular time frame. In some circumstances, many routes may be available from source to destination that may be used to deliver data in the particular time frame while also adhering to one or more parameters. In some circumstances, it may be desirable to have data delivered from the source to the destination within a particular amount of time while also adhering to one or more parameters.

In some embodiments of the present disclosure, multiple paths may be identified that may be used to deliver data from the source to the destination, such that any one path of the multiple paths may be used. The network links of the multiple paths may include similar characteristics such that the costs related to data traversing any one path of the multiple paths from source to destination may be substantially similar and the data may be delivered in the particular time frame using any one of the multiple paths. In instances in which it may be beneficial to receive data within a constrained period of time, such as streaming a high definition movie without lagging or buffering, one or more delay constrained paths may be identified from the multiple paths that may be verified to be capable of delivering the data within the constrained period of time. A segment identifier (SID) list may be generated based on a delay constrained path with a reduced number of identifiers that may be used to route the data through the network within the constrained period of time.

Figure 1:
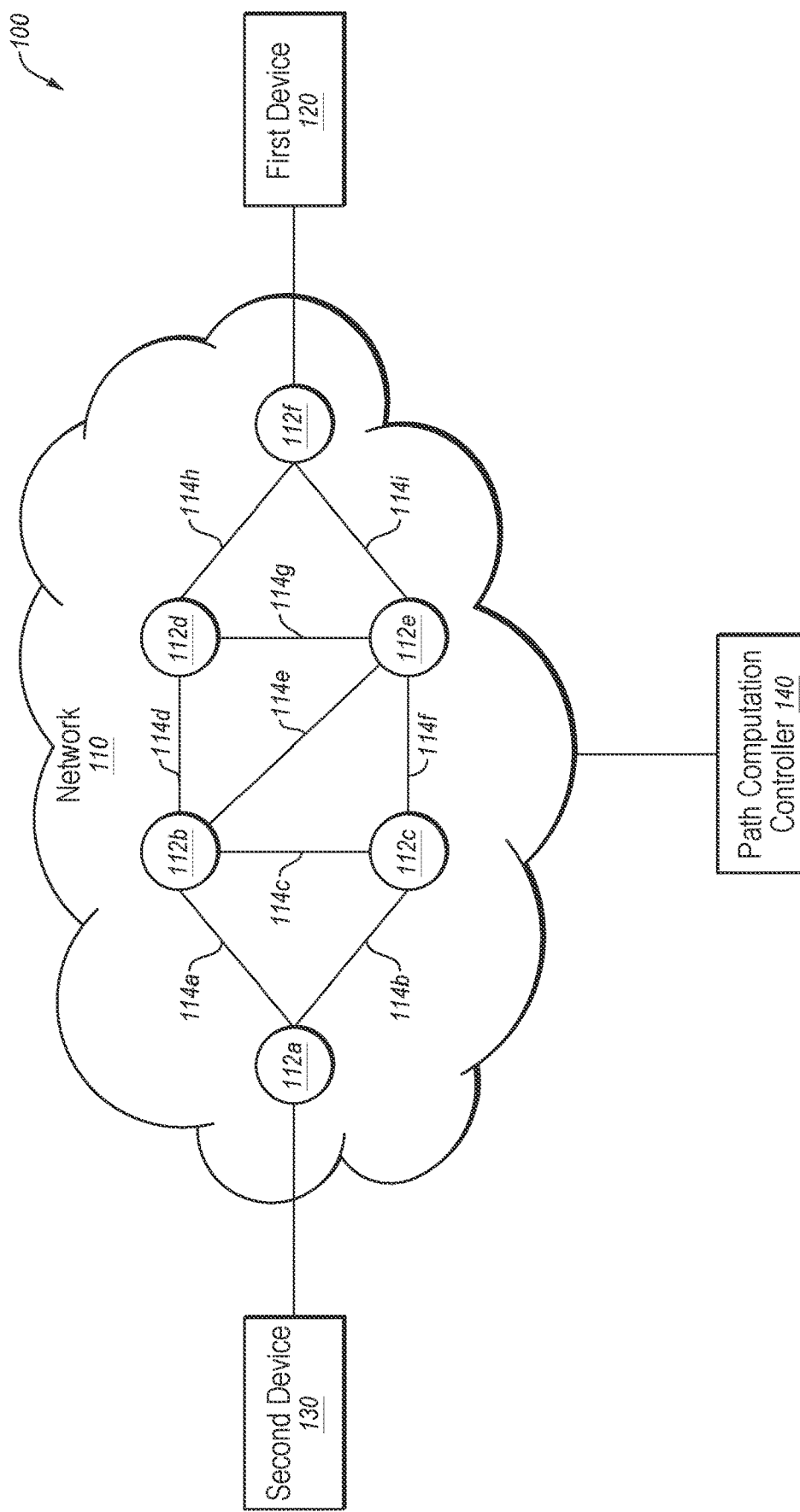
FIG. 1 is a block diagram of an example environment for path routing with delay constraints.

FIG. 1 illustrates an example environment 100 for path routing with delay constraints. The environment 100 may be arranged in accordance with at least one embodiment described in the present disclosure. The operating environment 100 may include a network 110, a first device 120, a second device 130, and path computation controller 140. The network 110 may include a first network node 112a, a second network node 112b, a third network node 112c, a fourth network node 112d, a fifth network node 112e, and a sixth network node 112f, referred to collectively as the network nodes 112. The network 110 may further include a first network link 114a, a second network link 114b, a third network link 114c, a fourth network link 114d, a fifth network link 114e, a sixth network link 114f, a seventh network link 114g, an eighth network link 114h, and a ninth network link 114i, referred to collectively as the network links 114. Each of the network links 114 may extend between two of the network nodes 112 as illustrated in FIG. 1.

In some embodiments, each of the network links 114 may include a communicative coupling between two network nodes. For example, the first network link 114a may include a transmitter in the first network node 112a, a receiver in the second network node 112b, and a communication channel between the first network node 112a and the second network node 112b that is coupled between the transmitter and the receiver. Alternatively or additionally, the first network link 114a may also include a receiver in the first network node 112a, a transmitter in the second network node 112b, and a communication channel between the first network node 112a and the second network node 112b that is coupled between the transmitter and the receiver.

In some embodiments, the communication channels of the network links 114 may include a wired technology, such as coaxial cable, ethernet cable, optical fiber, and/or other similar wired technologies. Alternatively or additionally, the communication channel may include wireless technology, such as Bluetooth®, Wi-Fi, WiMAX, cellular communications, and/or other similar wireless technologies. In these and other embodiments, the communication channel of the network links 114 may be similar whether a given node is transmitting or receiving. For example, the first network node 112a may use a communication channel of the first network link 114a to transmit data to the second network node 112b and the first network node 112a may use the same communication channel of the first network link 114a to receive data from the second network node 112b. Alternatively or additionally, the communication channel may be unique between network nodes 112 depending on whether a network node is transmitting or receiving. For example, the first network node 112a may use a first communication channel of the first network link 114a to transmit data to the second network node 112b and the first network node 112a may use a second communication channel of the first network link 114a to receive data from the second network node 112b. The receivers and the transmitters of the network links 114 in the network nodes 112 may be parts of transceivers or other equipment used to receive, transmit, adjust, or otherwise handle signals in the network nodes 112.

In some embodiments, the network links 114 may include one or more routing metrics. The routing metrics may include details associated with the network links 114 that may be used in determining a route between the network nodes 112. For example, in instances in which a system is attempting to route data from a first network node to a second network node, the system may consider the routing metrics of the network links 114 between the first node and the second node to determine a path between the first network node and the second network node based on the routing metrics.

In some embodiments, the routing metrics may include a cost and/or a delay associated with using a network link. In some embodiments, the cost routing metric associated with a network link may include a length of a network link, a bandwidth of the network link, a preference assigned to the network link, and/or a monetary cost of maintaining and/or operating the network link, among other criteria. In some embodiments, the delay associated with a network link may include a latency between sending data from a first network node to receiving the data at a second network node. In these and other embodiments, the cost routing metric of a network link may include one or more values that are determined based on these criteria. For example, a value for the cost routing metric of a network link may be a mathematical combination of values for each of the criteria associated with the cost routing metric. Alternately or additionally, the value of the cost routing metric of the network link may be a vector or an array of values that represent values for each of the criteria. Alternatively or additionally, the value of the cost routing metric may represent scores of the network link with respect to the criteria or some other evaluation of the network link with respect to the criteria.

In some embodiments, the network nodes 112 may be configured to transmit data to other network nodes 112 and/or devices, such as the first device 120 or the second device 130. Alternatively or additionally, the network nodes 112 may be configured to receive data from other network nodes 112 and/or devices. In some embodiments, the network nodes 112 may include a switch, a router, various combinations thereof, and/or other similar networking devices. For example, in instances in which one or more of the network nodes 112 are switches, the network nodes 112 may include one or more multiple packet routing system (MPRS) switches or MPLS (Multi-Protocol Label Switching). In instances in which one or more of the network nodes 112 are routers, the network nodes 112 may include one or more internet protocol (IP) routers. Alternatively or additionally, the network nodes 112 may include combinations of switches and routers.

In some embodiments, the network 110 may include the network nodes 112 and the network links 114. In these and other embodiments, the network 110 may be configured to route data through the network nodes 112 and the network links 114. For example, a first network node of the network nodes 112 may request data from a second network node of the network nodes 112. The data may be transmitted between the network nodes 112 via the network links 114 from the second network node to the first network node. In some embodiments, the network 110 may be used to connect one or more devices, such as the first device 120 and the second device 130. For example, the first device 120 may be communicatively coupled to the sixth network node 112f of the network 110 and the second device 130 may be communicatively coupled to the first network node 112a of the network 110, such that the first device 120 and the second device 130 may be configured to exchange data via the network 110.

In some embodiments, the network 110 may be configured to enable data transfer between the two or more devices. For example, the first device 120 may send a request for data to the second device 130 via the network 110, and the second device 130 may respond to the data request from the first device 120 by providing data over the network 110 to the first device 120. In some embodiments, the first device 120 and/or the second device 130 may include any device that may be configured to communicatively couple to the network 110, such as by transmitting or receiving data. For example, the first device 120 and/or the second device 130 may include desktop computer, a laptop computer, a smartphone, a mobile phone, a tablet computer, a server, a processing system, or any other computing device that may be configured to communicatively couple to the network 110.

In some embodiments, the network 110 may include network information. The network information may include a network topology of the network 110 that may provide information about the network 110. The network topology may include a number and location of the network nodes 112 and the network links 114 that may connect the network nodes 112. Alternatively or additionally, the network topology may provide the routing metrics associated with the network links 114, which may include the cost and the delay associated with a particular network link of the network links 114.

Alternatively or additionally, the network information may include one or more shortest paths between each network node of the network nodes 112 to all other network nodes via the network links 114. In some embodiments, the shortest paths between any two network nodes may include the paths with a fewest number of the network links 114 between the two network nodes. In these and other embodiments, all paths of the shortest length between the two network nodes may be considered the shortest paths. For example, a shortest path from the first network node 112*a* to the fifth network node 112*e* may include the path of the first network link 114*a* to the second network node 112*b* and the fifth network link 114*e* to the fifth network node 112*e*. Another shortest path from the first network node 112*a* to the fifth network node 112*e* may include the path of the second network link 114*b* to the network nodes 112*c* and the sixth network link 114*f* to the fifth network node 112*e*.

Alternatively or additionally, the shortest paths may be determined based on the routing metrics of the network links 114. For example, the shortest paths may be determined based on the cost routing metric of the network links 114. In these and other embodiments, the shortest paths may be paths with a fewest number of the network links 114 between the two network nodes that also include the lowest cost. The cost of a path may be a mathematical combination of the costs of the network links 114 along the path. For example, a path with five network links 114 that each include a cost, the cost of the path may be a combination, such as an addition, of all of the costs of the five network links 114. Thus, shortest paths between two network nodes may not include a first path with the fewest number of network links 114 between the two network nodes if the costs along the first path are greater than costs of a second path with a greater number of network links 114 between the two network nodes. In these and other embodiments, the shortest paths may be paths with a fewest number of the network links 114 and with lowest path costs. Thus, there may be multiple shortest paths between two network nodes, but the multiple shortest paths may each have an equal path cost.

As an example, from the previous example of two shortest paths from the first network node 112*a* to the fifth network node 112*e*, the first network link 114*a*, the second network link 114*b*, and the fifth network link 114*e* may include a first cost and the sixth network link 114*f* may include a second cost that is greater than the first cost. As a result, the shortest paths from the first network node 112*a* to fifth network node 112*e* may only include the path of the second network link 114*b* to the network node 112*c* and the sixth network link 114*f* to the fifth network node 112*e*. In these and other embodiments, the shortest paths may be determined for each network node of the network nodes 112 to all other network nodes.

In some embodiments, the shortest paths may be determined before a particular request to send data between the network nodes 112. For example, the shortest paths may be determined based on changes to the network 110, however, the determination of the shortest paths may not be determined in response to a request for data. Rather, the shortest paths determined prior to receiving the request for data may be used in determining how to route the requested data through the network 110. In some embodiments, the shortest paths may be determined by the path computation controller 140. For example, the path computation controller 140 may obtain the network information and may determine the one or more shortest paths for each network node of the network nodes 112. Alternatively or additionally, each network node of the network nodes 112 may be configured to determine the shortest path between the other network nodes of the network nodes 112. Alternatively or additionally, one or more of the network nodes 112 may be configured to determine the shortest path between each network node and all other of the network nodes 112.

In some embodiments, the path computation controller 140 may include any configuration of hardware, such as processors, servers, and storage servers, such as database servers, that are networked together and configured to perform one or more tasks. For example, the path computation controller 140 may include one or multiple computing systems, such as multiple servers that each include memory and at least one processor.

In some embodiments, the path computation controller 140 may be configured to obtain the network information of the network 110. Using the network information, the path computation controller 140 may be configured to determine the shortest path between any two or more given nodes of the network nodes 112.

In some embodiments, the path computation controller 140 may be configured to determine a delay constrained path between the network nodes 112. In some embodiments, the path computation controller 140 may obtain a delay constraint as part of a request for data to be passed through the network 110. In these and other embodiments, the path computation controller 140 may be configured to determine a delay constrained path for the requested data through the network 110 as a subset path from the shortest paths that may have already been determined. For example, the path computation controller 140 may first determine one or more shortest paths between two nodes. After determining the shortest paths, the path computation controller 140 may further determine a delay constrained path that may satisfy the delay constraint while using the shortest paths when possible. In some embodiments, the number of delay constrained paths may be equal to the number of shortest paths. In some embodiments, the delay constrained path may include an indication of each node of the network nodes 112 that may be included in the delay constrained path.

In some embodiments, a path may satisfy a delay constraint when a combination of the delay routing metrics of the network links 114 along the path are less than or equal to the delay constraint. For example, in instances in which the network links 114 include a delay routing metric, the delay of each network link included in the shortest path from a first network node to a second network node may be combined to determine if the shortest path between the first network node and the second network node also satisfies the delay constraint.

In some embodiments, the path computation controller 140 may be configured to update the network information. For example, in instances in which a new network node is added to the network nodes 112, the path computation controller 140 may be configured to determine shortest paths from the new network node to all other network nodes 112. Further, the path computation controller 140 may be configured to redetermine the shortest paths for the previously existing network nodes 112 to all other network nodes 112. Alternatively or additionally, in instances in which a network node is removed from the network 110, the path computation controller 140 may be configured to update the network information, which may include determining shortest paths between the remaining network nodes. Alternatively or additionally, in instances in which a new network link is added to or removed from the network 110, the path computation controller 140 may be configured to determine new shortest paths for all the network nodes 112.

In some embodiments, the network nodes 112 may further include information regarding the network 110. For example, a network node may include information regarding shortest paths from the network node to other network nodes 112 in the network 110. In some embodiments, the path computation controller 140 may provide the information regarding the shortest paths to the network nodes 112. Alternately or additionally, the network nodes 112 may determine the shortest paths and provide the information to the path computation controller 140.

In some embodiments, the path computation controller 140 may use the delay constrained path to generate a segment identifier (SID) list. The SID list may include one or more of the network nodes 112 through which the delay constrained path may be routed. In some embodiments, the SID list may include each node of the network nodes 112 through which the delay constrained path is routed. In some embodiments, the first network node and the last network node of a path between the first network node and the last network node may be included in the SID list. Alternatively or additionally, some or all the network nodes between the first network node and the last network node may be included in the SID list. Alternatively or additionally, the SID list may not include all the network nodes through which the delay constrained path may be routed. For example, in instances in which two shortest paths from a first network node to a second network node includes paths through two different intermediate nodes and both of the paths satisfy a delay constraint, the first network node and the last network node may be added to the SID list. In these and other embodiments, either path may be an option for a delay constrained path from the first network node to the second network node.

In some embodiments, the SID list may be used by the network nodes 112 to pass data through the network 110. For example, a network node may obtain data and a SID list. The network node may pass the data to the next network node in the SID list. In some embodiments, as discussed above, the SID list may not include all of the network nodes along the path. In these and other embodiments, when the next network node in the SID list is not adjacent to the network node, the network node may select a shortest path from the network node to the next network node in the SID list. The shortest path may indicate an adjacent network node that is adjacent to the network node. The network node may pass the data to the adjacent network node. The adjacent network node may continue to pass the data accordingly to the SID list. In these and other embodiments, the SID list may be constructed such that the SID list only allows shortest paths to be selected by the network nodes that adhere to a delay constraint used in constructing the SID list.

As an example of routing data through a network using a SID list, the first device 120 may desire data from the second device 130 and may send a request to the second device 130 for the data over the network 110. The request for data may include a delay constraint. Prior to receiving the request for data, the path computation controller 140 may be configured to obtain network information regarding the network 110. As described above, the network information may have included information related to the network nodes 112, the network links 114 including the routing metrics, the shortest paths between the network nodes 112, including fewest number of network links with respect to the cost routing metric, and a delay constrained path. The request for data may be provided to the second device 130 and the path computation controller 140.

The path computation controller 140 may determine a SID list for routing the data from the second device 130 to the first device 120 through the network 110. The path computation controller 140 may determine the first network node 112a as a source network node and the sixth network node 112f as a destination network node. The path computation controller 140 may add the first network node 112a as first network node in the SID list.

The path computation controller 140 may obtain the three shortest paths from the first network node 112a to the sixth network node 112f. The first path may include the first network link 114a, the fourth network link 114d, and the eighth network link 114h, through the second network node 112b and the fourth network node 112d. The second path may include the first network link 114a, the fifth network link 114e, and the ninth network link 114i, through the second network node 112b and the fifth network node 112e. The third path may include the second network link 114b, the sixth network link 114f, and the ninth network link 114i, through the network node 112c and the fifth network node 112e.

The path computation controller 140 may obtain the delay constrained path. The delay constrained path may be from the first network node 112a to the sixth network node 112f and may be determined using the three shortest paths, the delay routing metrics of the network links 114, and the delay constraint. For example, the path computation controller 140 may analyze the shortest paths to determine the delay constrained path that satisfies the delay constraint. The delay constrained path may include each nodes of the network nodes 112 through which the delay constrained path is routed. For example, the delay constrained path may follow the first path. The path computation controller 140 may determine other nodes to include in the SID list using the delay constrained path, the shortest paths, the delay routing metrics of the network links 114, and the delay constraint.

For example, the delay routing metric of the second network link 114b may be of a duration that the delay constraint may not be satisfied if the path includes the second network link 114b even though the second network link 114b is included in a shortest path. Thus, the path computation controller 140 may append the second network node 112b to the SID list to ensure that the data is routed along the first network link 114a to the second network node 112b and not along the second network link 114b. The path computation controller 140 may analyze the shortest paths from the second network node 112b to the sixth network link 114f and the delay routing metrics of the network links along the shortest paths. The shortest paths may include the fourth network node 112d and the fifth network node 112e. Based on the delay routing metrics of the network links, the path computation controller 140 may determine that either path may be used to satisfy the delay constraint. As such, the path computation controller 140 may append the sixth network node 112f to the SID list without appending the fourth network node 112d and the fifth network node 112e. Thus, the SID list may include the first network node 112a, the second network node 112b, and the sixth network node 112f. In this circumstance, the second network node 112b may select a shortest path to the sixth network node 112f in response to the second network node 112b obtaining the data that is being sent to the first device 120.

The path computation controller 140 may provide the complete SID list to the first network node 112a (e.g. the SID list including the first network node 112a, the fifth network node 112e, and the sixth network node 112f). The first network node 112a may use the SID list to direct the data received from the second device 130 through the network nodes 112 of the network 110, until the first device 120 may obtain the data from the sixth network node 112f.

Modifications, additions, or omissions may be made to the environment 100 without departing from the scope of the present disclosure. For example, in some embodiments, the network 110 may include more or fewer network nodes 112 and network links 114 than those illustrated. Alternatively or additionally, the path computation controller 140 may not be present in the environment 100, such as in instances in which one or more of the network nodes 112 is configured to perform the functions performed by the path computation controller 140.

Figure 2:
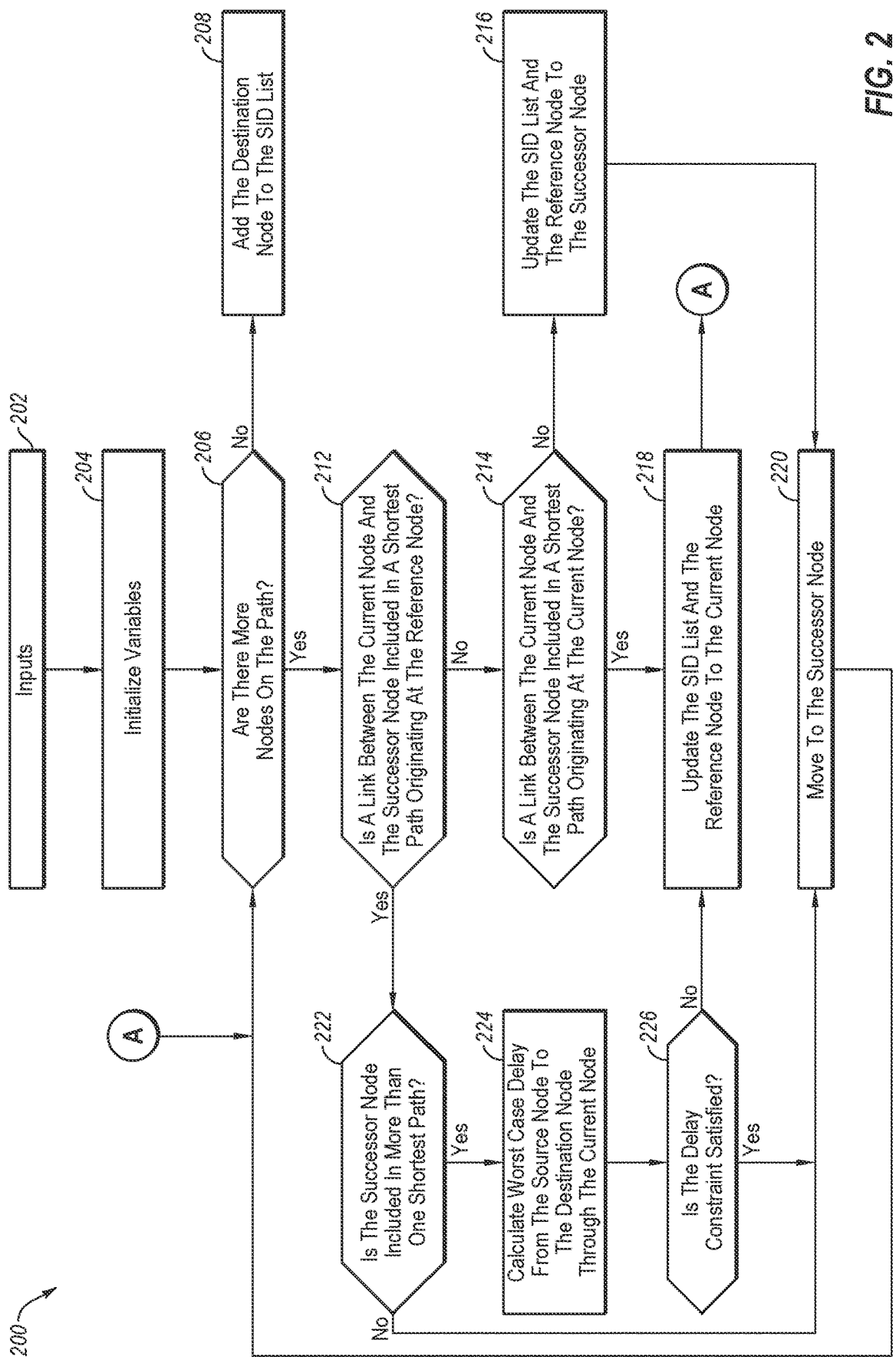
FIG. 2 illustrates an example algorithm for path routing with delay constraints.

FIG. 2 illustrates an example algorithm 200 for path routing with delay constraints, according to at least one embodiment in the present disclosure. In some embodiments, the algorithm 200 may be configured to iteratively determine a segment identifier (SID) list for path routing through one or more nodes of a network in view of delay constraints. For example, the algorithm 200 may iterate through the steps of the algorithm and perform decisions and actions to determine the SID list.

In some embodiments, a path computation controller, such as the path computation controller 140 of FIG. 1, may be configured to perform the algorithm 200. Alternatively or additionally, one or more of the nodes (e.g., the network nodes 112 of FIG. 1) may be configured to perform the algorithm 200. In these and other embodiments, the algorithm 200 may be performed based on the execution of instructions stored on one or more non-transitory computer-readable media. Although illustrated as discrete blocks, various blocks may be divided into additional blocks, combined into fewer blocks, or eliminated, depending on the desired implementation. The steps of the algorithm 200 may be performed iteratively until an end condition is reached. In some embodiments, the algorithm 200 may be configured to minimize a number of nodes included in an SID list while maintaining a route defined by the SID list that satisfies a delay constraint.

In some embodiments, the algorithm 200 may begin at block 202. At block 202, one or more inputs may be obtained. In some embodiments, the inputs may include a network topology of a network, a transmission delay constraint, one or more shortest paths from each node to all other nodes in the network, a delay constrained path, an input path, and a starting node. In some embodiments, the nodes of the algorithm may be analogous to the network nodes 112 of FIG. 1.

In some embodiments, the input path may include a path between nodes in the network from a source node (e.g., the starting node) to a destination node, where the source node and the destination node may be nodes included in the network. In some embodiments, the input path may include a shortest path from the source node to the destination node. Alternatively or additionally, the input path may include the delay constrained path. For example, the input path may include a path through the nodes of the network which satisfies the transmission delay constraint and minimizes the cost of the path through the network. In these and other embodiments, the path may include an indication of each node included in the path through the nodes of the network. Note that the path may not always include shortest paths when following the shortest paths makes satisfying the transmission delay constraint not possible.

At block 204, the source node may be added to the SID list. The SID list may include a node identifier of the nodes of the network to be included in a delay constrained path for data to traverse the network from a source node to a destination node. For example, each node in the network may include a unique node identifier that may include an alphanumeric character, a string of alphanumeric characters, and/or other characters that may identify each node. The node identifier may be the value added to the SID list to represent the associated node, e.g., the source node, to be included in the delay constrained path. In some embodiments, the SID list may include each node included in the shortest path from the source node to the destination node. For example, in instances in which the network includes many links and/or paths between the nodes, each node included in the delay constrained path may be included in the SID list from the source node to the destination node, including the source node and the destination node. Alternatively or additionally, the SID list may include the source node and the destination node and no intermediate nodes. For example, only the source node and the destination node may be included in a SID list in a path that only includes the sources node and destination node (two nodes connected by one link). Alternatively, a SID list for a path may include only the source node and the destination node in instances in which all paths between the source node and the destination node may be equal cost and may satisfy the transmission delay constraint. Alternatively or additionally, the SID list may include the source node, the destination node, and one or more intermediate nodes.

In some embodiments, the algorithm 200 may use various variables. The variables may represent a node in the network. The variables may include a current node, a successor node, and a reference node. In general, the reference node may be the latest node added to the SID list. The current node may be node current being evaluated by the algorithm 200 for inclusion in the SID list and the successor node may be the node directly adjacent to the current node in the input path. Further at block 204, the current node may be set as the source node, the reference node may be set as the source node, and the successor node may be set as the node directly adjacent to the source node in the input path.

At block 206, the algorithm 200 may determine if the current node is the destination node. In instances in which the current node is the destination node, the algorithm 200 may move to block 208. Alternatively, in instances in the current node is not the destination node, the algorithm 200 may move to block 212.

At block 212, the algorithm 200 may determine whether a link between the current node and the successor node is included in any one of the shortest paths with an origin of the reference node. For example, determining the shortest paths may be analogous to the shortest path routing through a network as discussed relative to FIGS. 4A and 4B.

In response to link between the current node and the successor node being included in any one of the shortest paths with an origin of the reference node, the algorithm 200 may move to block 222. In response to link between the current node and the successor node not being included in any one of the shortest paths with an origin of the reference node, the algorithm 200 may move to block 214.

At block 222, the algorithm 200 may determine whether the successor node is included in more than one of the shortest paths that originate from the reference node. For example, with respect to FIG. 1, if the reference node is the first network node 112a and the successor node is the fifth network node 112e, there are two shortest paths from the first network node 112a to the fifth network node 112e, namely the path through the second network node 112b and the path through the third network node 112c. The successor node that is included in more than one of the shortest paths may include multiple predecessor nodes. The predecessor nodes may include nodes directly adjacent and prior to the successor node.

In response to the algorithm 200 determining at block 222 that the successor node is not included in more than one of the shortest paths that originate from the reference node, the algorithm 200 may move to block 220. In response to the algorithm 200 determining at block 222 that the successor node is included in more than one of the shortest paths that originate from the reference node, the algorithm 200 may move to block 224.

At block 220, the current node may be set as the successor node, and the successor node may be assigned to a node directly adjacent to the new current node in the input path. After block 220, the algorithm 200 may move to block 206 and continue iterating as described with respect to FIG. 2.

At block 224, the algorithm 200 may be configured to determine a delay from the source node to the destination node for the input path routed through the current node. For example, determining the delay may be analogous to the transmission delay calculation of FIG. 3. For example, the algorithm 200 may be configured to determine a first delay from the source node to the current node, a second delay from the current node to the successor node, and a remaining delay from the successor node to the destination node. The total determined delay may include a combination of the first delay, the second delay, and the remaining delay, such as an addition of the delays.

In these and other embodiments, determining the delay calculation may include determining a worst-case delay. For example, in instances in which more than one path exists between any segment of the delay calculations, each segment may include a delay calculation and the segment with the worst delay may be included in the delay calculation of block 224.

At block 226, the algorithm 200 may compare the determined delay of block 224 with the transmission delay constraint obtained from block 202. In instances in which the determined delay is less than or equal to the transmission delay constraint, the algorithm 200 may move to block 220 and continue with the algorithm as previously described relative to block 220. In instances in which the determined delay is greater than the transmission delay constraint, the algorithm 200 may move to block 218.

At block 218, the algorithm 200 may append the current node to the SID list. For example, in instances in which the source node is already included in the SID list, appending the current node to the SID list may provide an indication that the current node is included in the delay constrained path at some point after the source node. The current node appended to the SID list may be in response to the successor node of the current node being included in more than one shortest paths where not all of the shortest paths through the successor node satisfy the transmission delay constraint, as determined at block 226. At block 218, the reference node may also be set as the current node. Following block 218, the algorithm 200 may continue at block 206.

As discussed previously, at block 212 in response to link between the current node and the successor node not being included in any one of the shortest paths with an origin of the reference node, the algorithm 200 may move to block 214. At block 214, the algorithm 200 may determine whether a link between the current node and the successor node is included in any one of the shortest paths with an origin of the current node.

In instances in which a link between the current node and the successor node is included in at least one of the shortest paths with an origin of the current node), the algorithm 200 may move to block 218 as previously described.

In instances in which a link between the current node and the successor node is not included in at least one of the shortest paths with an origin of the current node, the algorithm 200 may move to block 216. At block 216, the algorithm 200 may append the current node and the successor node to the SID list. For example, in instances in which the source node is already included in the SID list, appending the current node and the successor node to the SID list may provide an indication that the current node and the successor node are included in the delay constrained path at some point after the source node. At block 216, the reference node may be set as the successor node. For example, as both the current node and the successor node were determined to be included in the delay constrained path, the reference node may also be updated to the successor node as that is the latest node in the SID list. Following block 216, the algorithm 200 may move to block 220, which as described above, the algorithm 200 may assign the successor node to be the current node and may continue the algorithm 200 at block 206.

Referring back to block 206, in instances in which the algorithm determines there are no additional nodes on the input path, the algorithm may move to block 208. At block 208, the destination node may be added to the SID list. For example, the destination node may be the last node added to the SID list as it is the end of the path between the source node and the destination node. After the destination node is added to the SID list, the SID list may be obtained by the source node for routing data through the network.

Modifications, additions, or omissions may be made to the algorithm 200 without departing from the scope of the present disclosure. For example, one or more of the decision steps and/or the operation steps may be combined into fewer blocks or separated into additional blocks.

FIG. 3 illustrates an example visualization 300 of a transmission delay calculation, according to at least one embodiment in the present disclosure. The visualization 300 may include a network 310. The network 310 may include a first network node 312a, a second network node 312b, a third network node 312c, a fourth network node 312d, and a fifth network node 312e, referred to collectively as the network nodes 312. The network 310 may further include a first network link 314a, a second network link 314b, a third network link 314c, a fourth network link 314d, and a fifth network link 314e, referred to collectively as the network links 314. The network may further include a first delay 320a, a second delay 320b, and a remaining delay 320c, referred to collectively as the total delay 320.

In some embodiments, the network 310 may be analogous to the network 110 of FIG. 1. Alternatively or additionally, the network 310 may include more or less network nodes 312 and/or network links 314 than the network nodes 112 and/or the network links 114 of the network 110.

In some embodiments, the network 310 may include network information which may include one or more shortest paths between the network nodes 312. For example, the network information may include two shortest paths from the first network node 312a to the fifth network node 312e. The first path may include the first network link 314a, the third network link 314c, and the fifth network link 314e. The second path may include the first network link 314a, the second network link 314b, the fourth network link 314d, and the fifth network link 314e. In the previous example, although the first path includes fewer network links than the second path, the third network link 314c may include a cost that is similar to a combination of the costs of the second network link 314b and the fourth network link 314d, such that the first path and the second path are both shortest paths from the first network node 312a to the fifth network node 312e. In some embodiments, the network information, including the shortest paths between the network nodes 312, may be determined by a path computation controller, such as the path computation controller 140 of FIG. 1.

In some embodiments, the network links 314 may include one or more routing metrics. For example, each network link of the network links 314 may include a delay routing metric. The delay routing metric may provide an indication of a delay that may be experienced by data passing from the transmitting network node to the receiving network node using the network link. In some embodiments, the delay routing metric may be determined and/or known by the path computation controller.

In some embodiments, requests for data between two network nodes may include a delay constraint. For example, the fifth network node 312e may request data from the first network node 312a, and the fifth network node 312e may request the data be provided within a provided delay constraint.

In some embodiments, the path computation controller may be configured to determine a delay constrained path from the shortest paths. In some embodiments, the delay constrained path may include one or more of the network links 314 between two network nodes 312. In some embodiments, the path computation controller may be configured to determine the delay constrained path procedurally. For example, the path computation controller, when determining the delay constrained path, may advance through the network nodes of the shortest paths one network node at a time, and the path computation controller may be configured to compare the first delay 320a, the second delay 320b, and the remaining delay 320c associated with the network node.

In some embodiments, the path computation controller may be configured to determine the first delay 320a. The first delay 320a may include a combination of the delay routing metrics, such as an addition, for one or more network links 314 from a source network node to a predecessor network node. In some embodiments, the first delay 320a may include a worst-case delay computation between the source network node and the predecessor network node.

The source network node may include a network node in the network 310 where data configured to traverse the network 310 may originate. For example, in an instance where data is configured to be sent from the first network node 312a to the fifth network node 312e, the first network node 312a may be the source network node. The predecessor network node may include a network node that the path computation controller has determined is included in a shortest path and is included in a delay constrained path.

In some embodiments, the one or more paths associated with the first delay 320c (e.g., the first paths) may include a single network link between the source network node and the predecessor network node. Alternatively or additionally, the first paths may include one or more intermediate network nodes, such as two, three, four, six, ten, fifteen or more intermediate network nodes, between the source network node and the predecessor network node. In these and other embodiments, the path computation controller has determined that the first paths are included in the delay constrained paths.

In some embodiments, the path computation controller may be configured to determine the second delay 320b. The second delay 320b may include a combination of the delay routing metrics, such as an addition, for one or more paths through the network links 314 from the predecessor network node to a successor network node. In some embodiments, the second delay 320b may include a worst-case delay computation between the predecessor network node and the successor network node. For example, in instances in which there are two shortest paths from the predecessor network node to the successor network node, the path computation controller may be configured to determine a first computed delay for the first shortest path and a second computed delay for the second shortest path, and the second delay 320b may set to be equal to the greater of the first computed delay and the second computed delay.

In some embodiments, the path computation controller may be configured to determine the remaining delay 320c. The remaining delay 320c may include a combination of the delay routing metrics, such as an addition, for one or more network links 314 from the successor network node to a destination network node.

The destination network node may include a network node in the network 310 where data configured to traverse the network 310 may stop traversing the network 310 or may be configured to be transmitted from the network 310 to a connected device, such as the first device 120 of FIG. 1. For example, in an instance where data is configured to be sent from the first network node 312a to the fifth network node 312e, the fifth network node 312e may be the destination network node. In some embodiments, the remaining delay 320c may include a worst-case delay computation between the successor network node and the destination network node.

In some embodiments, the one or more paths associated with the remaining delay 320c (e.g., the remaining paths) may include a single network link between the successor network node and the destination network node. Alternatively or additionally, the remaining paths may include one or more intermediate network nodes, such as two, three, four, six, ten, fifteen or more intermediate network nodes, between the successor network node and the destination network node, in which the path computation controller has determined the remaining paths are included in the shortest paths.

As an example, in determining a delay constrained path from the first network node 312a to the fifth network node 312e, the path computation controller may have determined two shortest paths, as described above, where the first path does not include the third network node 312c and the second path includes the third network node 312c. The path computation controller may traverse the shortest paths until the fourth network node 312d is reached and the path computation controller determines that the routes of multiple paths each arrive at the fourth network node 312d.

The path computation controller may determine the first delay 320a by obtaining the delay routing metric associated with the first network link 314a, which is the network link between the source network node (i.e., first network node 312a) and the predecessor node (i.e., second network node 312b).

The path computation controller may further determine the second delay 320b by obtaining the delay routing metrics for the two paths from the predecessor node to the successor node (i.e., fourth network node 312d). The delay routing metric for the first path may include the delay routing metric associated with the third network link 314c. The delay routing metric for the second path may include a combination, such as an addition, of the delay routing metrics associated with the second network link 314b and the fourth network link 314d. The path computation controller may compare the delay routing metrics of the first path and the second path and may set the second delay 320b to be equal to the worst-case delay routing metric of the first path and the second path.

The path computation controller may further determine the remaining delay 320c by obtaining the delay routing metric associated with the fifth network link 314e, which is the network link between the successor node and the destination node (i.e., fifth network node 312e).

The total delay 320 may include a combination of the first delay 320a, the second delay 320b, and the remaining delay 320c, which may include a sum of the separate delays. In some embodiments, in response to the total delay 320 being less than the delay constraint, an SID list may be generated that does not define use of either the first path or the second path because both paths when traversed allow the delay constrained path to adhere to the delay constraint. Alternately or additionally, in response to the total delay 320 being more than the delay constraint, an SID list may be generated that defines use one of the first path and the second path and not the other of the first path and the second path. The one of the first path and the second path may be selected based on the one of the first path and the second path having a delay metric that is short enough to allow the delay constrained path to adhere to the delay constraint.

Figure 4A:
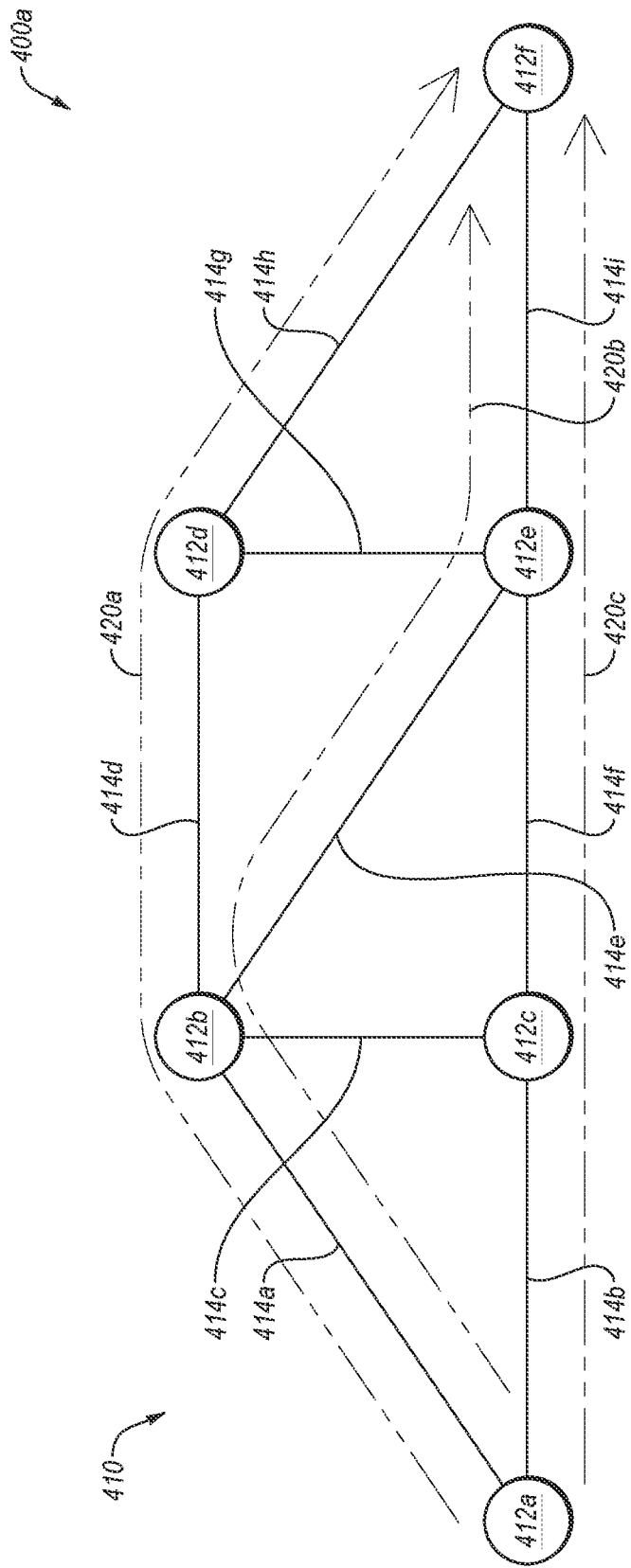
FIGS. 4A-B illustrate shortest path routing through an example network.
Figure 4B:
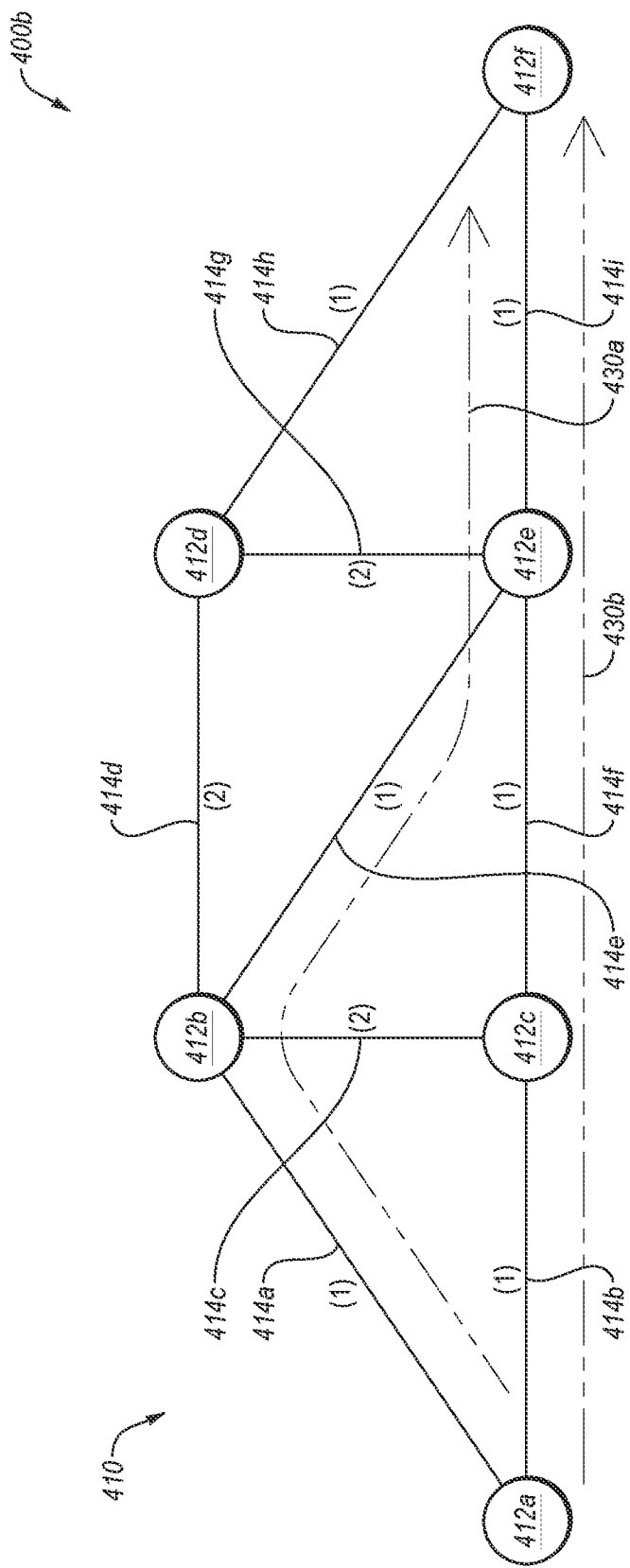

FIGS. 4A and 4B illustrate shortest path routing through an example network, according to at least one embodiment in the present disclosure. For example, FIG. 4A may illustrate a first network diagram 400a and FIG. 4B may illustrate a second network diagram 400b, referred to collectively as the network diagrams 400.

The network diagrams 400 may illustrate a network 410. The network 410 may be analogous to the network 110. The network 410 may include a first network node 412a, a second network node 412b, a third network node 412c, a fourth network node 412d, a fifth network node 412e, and a sixth network node 412f, referred to collectively as the network nodes 412. The network 410 may also include a first network link 414a, a second network link 414b, a third network link 414c, a fourth network link 414d, a fifth network link 414e, a sixth network link 414f, a seventh network link 414g, an eighth network link 414h, and a ninth network link 414i, referred to collectively as the network links 414.

In some embodiments, the first network diagram 400a may include a first shortest path 420a, a second shortest path 420b, and a third shortest path 420c, referred to collectively as the shortest paths 420.

In some embodiments, the shortest paths 420 may include the shortest paths from the first network node 412a to the sixth network node 412f. In some embodiments, the shortest paths 420 may be determined by a path computation controller, such as the path computation controller 140 of FIG. 1. Alternatively or additionally, each network node of the network nodes 412 may be configured to determine the shortest paths from itself to all other nodes in the network 410 and may provide the determined shortest paths to the path computation controller. Alternatively or additionally, one or more network nodes of the network nodes 412 may be configured to determine the shortest paths between each network node and all other of the network nodes 412.

In some embodiments, the shortest paths 420 may be determined based on the number of the network links 414 included between the network nodes that the shortest paths are traversing. For example, the shortest paths 420 each include three network links between the first network node 412a and the sixth network node 412f. Alternatively or additionally, the shortest paths 420 may include one or more paths with a cost routing metric smaller than other paths in the network 410, such as described in the second network diagram 400b of FIG. 4B. Alternatively or additionally, the shortest paths 420 may include combinations of paths with fewer network links than other paths and/or paths with smaller cost routing metrics than other paths.

In some embodiments, one or more of the shortest paths 420 may include similar network links as another shortest path in the network 410. For example, the first network link 414a may be included in the first shortest path 420a and the second shortest path 420b, and the ninth network link 414i may be included in the second shortest path 420b and the third shortest path 420c. Alternatively or additionally, each shortest path may include unique network links, such that no network links are used in more than one shortest path.

In some embodiments, the number of shortest paths in the network 410 may be equal to one less than the number of network nodes in the network 410. Alternatively or additionally, there may be only one shortest path between two network nodes in the network 410. Alternatively or additionally, there may be any number of shortest paths, from one to one less than the number of network nodes, between any two network nodes of the network 410.

As illustrated, the network links 414 of the first network diagram 400a of FIG. 4A each include an equal cost such that determining a shortest path from the first network node 412a to the sixth network node 412f may include the shortest paths 420 that have an equal number of network links. In some embodiments, each network link of the network links 414 may include a cost routing metric, such as shown in FIG. 4B, which may contribute to determining the shortest path.

FIG. 4B illustrates a second network diagram 400b that includes a similar network 410 as FIG. 4A. In some embodiments, the second network diagram 400b may include a first shortest path 430a, and a second shortest path 430b, referred to collectively as the shortest paths 430.

As illustrated, the network links 414 in the second network diagram 400b may include a cost routing metric. Although illustrated as a number, the cost routing metric may include other values that may represent a transmission cost associated with a network link. For example, the cost routing metric may include a vector, an array, and/or other quantities or data structures representative of a transmission cost.

In some embodiments, determining the shortest paths 430 may include determining a path with a cost routing metric less than or equal to other paths' cost routing metrics. In some embodiments, the cost routing metric for a path may include a combination of the cost routing metric for each network link in the path, such as an addition of each cost routing metric for each network link in a path.

For example, the shortest paths 430 differ from the shortest paths 420 of FIG. 4A in that the first shortest path 420a, through the first network link 414a, the fourth network link 414d, and the eighth network link 414h, is not included as a shortest path of the shortest paths 430. In particular, the shortest path 430a includes the first network link 414a, the fifth network link 414e, and the ninth network link 414i, with cost routing metrics of one, one, and one, respectively. Similarly, the shortest path 430b includes the second network link 414b, the sixth network link 414f, and the ninth network link 414i, with cost routing metrics of one, one, and one, respectively. The first shortest path 420a of FIG. 4A includes cost routing metrics of one, two, and one, respectively, such that the cost routing metric of the first shortest path 420a is greater than the cost routing metrics of the shortest path 430a and the shortest path 430b. Thus, the shortest path 430a and the shortest path 430b are the shortest paths 430 in view of the cost routing metrics.

Although the number of shortest paths 430 illustrated in the second network diagram 400b is not equal to the number of shortest paths 420 of the first network diagram 400a, there may be instances in which the number of shortest paths without regard of the cost routing metrics may be equal to the number of shortest paths with regard of the cost routing metrics. For example, if the fifth network link 414e and the second network link 414b each included a cost routing metric of two, the first shortest path 420a, the second shortest path 420b, and the third shortest path 420c may each be included in shortest paths 430 in view of the cost routing metrics.

In some embodiments, the shortest paths 430 may be determined prior to a request for data is received by the network 410. In some embodiments, the shortest paths 430 may be determined as changes to the network 410 are made, such as adding or subtracting a network node and/or a network link. In these and other embodiments, the shortest paths 430 may be used to determine a delay constrained path through the network 410.

Figure 5:
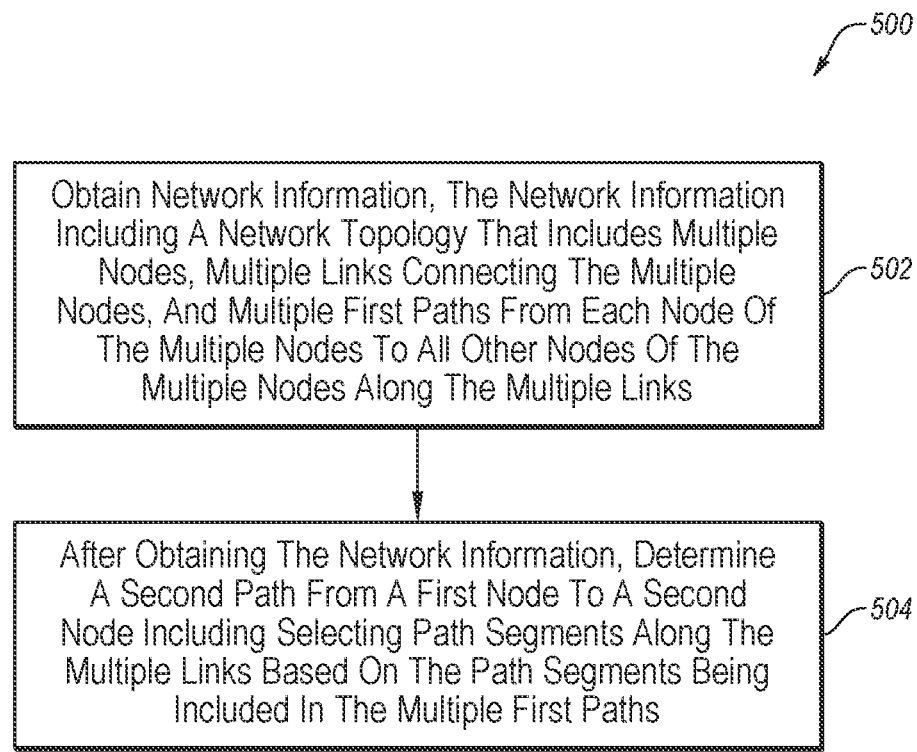
FIG. 5 illustrates a flowchart of an example method of path routing.

FIG. 5 illustrates a flowchart of an example method 500. The method 500 may be arranged in accordance with at least one embodiment described in the present disclosure. One or more operations of the method 500 may be performed, in some embodiments, by a device or system, such as the path computation controller 140 or the network nodes 112 of FIG. 1, the system 600 of FIG. 6, or another device, combination of devices, or system. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502 where network information of a network may be obtained. In some embodiments, the network information may include a network topology. The network topology may include multiple network nodes and multiple network links connecting the multiple network nodes. For example, the multiple network nodes may include a physical component of the network, such as one or more switches, one or more routers, and/or various combinations thereof. In some embodiments, the multiple network links may include one or more mechanisms for communication between the multiple network nodes.

In some embodiments, the multiple network links may include a first routing metric and a second routing metric. For example, a first routing metric may be a cost routing metric, which may include a cost associated with a given network link, such as a physical length of a network link, a bandwidth of the network link, a preference assigned to the network link, a monetary cost of physically maintaining the network link, etc. A second routing metric may be a delay routing metric which may include a transmission delay associated with a given network link, such as a latency between sending data from a first network node to receiving the data at a second network node in the network. In these and other embodiments, the routing metrics may be defined and/or calculated by the network. In some embodiments, the routing metrics may be known and/or determined before a particular request to send data between the network nodes via the network links.

Additionally, the network information may include first paths from each network node of the multiple network nodes to all other multiple network nodes the along the network links. The first paths may be determined based on the first routing metric. In some embodiments, the first network paths may be the shortest paths. For example, the shortest paths may include the paths with the least number of network links between the network nodes in view of the cost routing metric. In these and other embodiments, multiple paths may be included in the shortest path between two network nodes. For example, in an instance where there are three shortest paths from a first network node to a second network node based on each of the paths having an equal number of network links, one of the paths may be removed from the shortest paths as the one path may include a greater cost routing metric than the remaining two shortest paths. In some embodiments, the cost routing metric for a path may include a combination of cost routing metrics, such as an addition, for each network link included in the path. In some embodiments, the shortest path may include a path with more network links than an alternate path, but the shortest path may include a lesser cost routing metric. In some embodiments, the shortest paths may be known and/or determined before a particular request to send data between the network nodes via the network links.

At block 504, after the network information is obtained, a second path, such as a delay constrained path, from a first network node of the multiple network nodes to a second network node of the multiple network nodes may be determined. The determining the second path may include selecting path segments for the second path along the multiple network links based on the path segments being included in the first paths, such as the shortest paths, and based on the second link metric of the links included in the path segments.

For example, the second path may include network links of one or more of the shortest paths that may also satisfy the delay routing metric. In some embodiments, the delay routing metric may include a combination of delay routing metrics, such as an addition, for each network link included in a path.

In some embodiments, the delay constrained path may be determined one network link at a time. For example, the delay constrained path may begin at the same first network node as the shortest path and move to a next network node based on the shortest path. The delay constrained path may be configured to determine whether a combination of the network links in the shortest path satisfy the delay constraint. In some embodiments, the delay constrained path may include multiple routes through the network links that may satisfy the delay routing metric. In some embodiments, the delay constrained path may be determined after a request for data is submitted by a first network node from a second network node of the network.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include outputting an indication of network nodes included in the second path. The indication of network nodes may include network nodes of the multiple network nodes to constrain routing along the second network link based on the first path metric and the indication of network nodes not including all the network nodes of the multiple of network nodes included in the second path.

In some embodiments, the method 500 may further include updating the network information in response to a new network node being added to the multiple network nodes or a new network link being added to the multiple network links.

In some embodiments, the determining the second path may include obtaining a transmission delay constraint and an input path from the multiple network first paths that satisfy the first routing metric and adding a first node identifier associated with the first network node to the indication of network nodes. The determining the second path may further include traversing the input path from the first network node to the second network node adding one or more intermediate network node identifiers to the indication of network nodes. The one or more intermediate network node identifiers including a first intermediate network node that includes a successor network node, the successor network node having multiple predecessor network nodes wherein less than all paths from the first network node to the second network node, routed through the predecessor network nodes, satisfy the transmission delay constraint and a second intermediate network node wherein a network link of the multiple network links between a previous node and the second intermediate node is not included on any paths of the multiple first paths. The determining the second path may further include adding a last node identifier associated with the second network node to the indication of network nodes.

In some embodiments, satisfying the transmission delay constraint may include computing a first delay between the first network node and a current network node, a second delay between the current network node and the successor network node, and a remaining delay between the successor network node and the second network node. In these and other embodiments, the first delay, the second delay, and the remaining delay may include a worst-case delay computation. The satisfying the transmission delay constraint may further include comparing a sum of the first delay, the second delay, and the remaining delay to the transmission delay constraint and in instances in which the sum is greater than the transmission delay constraint, adding a network node identifier of the current network node to the indication of network nodes.

Figure 6:
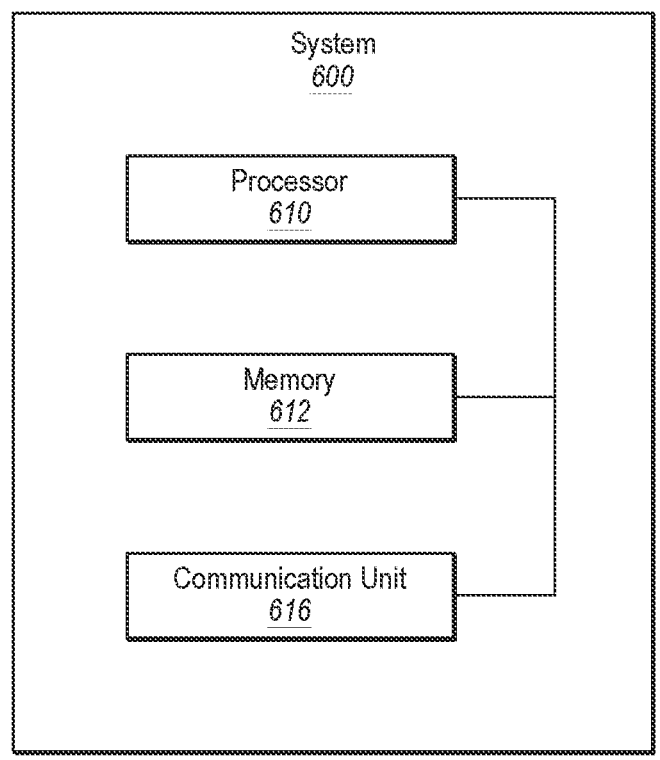
FIG. 6 illustrates an example system that may be used for path routing with delay constraints.

FIG. 6 is a block diagram illustrating an example system 600 that is arranged to be used in path encoding with delay constraints, according to at least one embodiment of the present disclosure. The system 600 may include a processor 610, memory 612, and a communication unit 616, which all may be communicatively coupled. In some embodiments, the system 600 may be part of any of the systems or devices described in this disclosure.

For example, the system 600 may be part of the path computation controller 140 of FIG. 1 and may be configured to perform one or more of the tasks described above with respect to the path computation controller 140. As another example, the system 600 may be part of any one of the network nodes 112, the first device 120, or the second device 130 of FIG. 1 and may be configured to perform one or more of the tasks described above.

Generally, the processor 610 may include any computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to path encoding with delay constraints such that the system 600 may perform or direct the performance of the operations associated therewith as directed by the instructions. In these and other embodiments, the instructions may be used to perform one or more operations of FIG. 2, or the method 500 of FIG. 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure. For example, when the system 600 is included in the path computation controller 140 of FIG. 1, the communication unit 616 may allow the path computation controller 140 to communicate with the network nodes 112.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
 obtaining network information of a network, the network information including:
  a network topology that includes a plurality of nodes and a plurality of links connecting the plurality of nodes, each of the plurality of links including a first routing metric and a second routing metric; and
  a plurality of first paths from each node of the plurality of nodes to all other nodes of the plurality of nodes along the plurality of links, the plurality of first paths determined based on the first routing metric;

after obtaining the network information, determining a second path from a first node of the plurality of nodes to a second node of the plurality of nodes, the determining the second path including selecting path segments for the second path along the plurality of links based on the path segments being included in the plurality of first paths and based on the second routing metric of the plurality of links included in the path segments; and obtaining, at the first node, an indication of nodes included in the second path, the indication of nodes including nodes of the plurality of nodes to constrain routing along the second path based on the first path metric, wherein determining the second path comprises:
  obtaining a transmission delay constraint and an input path from the plurality of first paths that satisfy the first routing metric;
  adding a first node identifier associated with the first node to the indication of nodes;
  traversing the input path from the first node to the second node adding one or more intermediate node identifiers to the indication of nodes, the one or more intermediate node identifiers comprising:
    a first intermediate node that includes a successor node, the successor node having multiple predecessor nodes wherein less than all paths from the first node to the second node, routed through the predecessor nodes, satisfy the transmission delay constraint; and
    a second intermediate node wherein a link of the plurality of links between a previous node and the second intermediate node is not included on any paths of the plurality of first paths; and
  adding a last node identifier associated with the second node to the indication of nodes; and wherein satisfying the transmission delay constraint comprises:
  computing a first delay between the first node and a current node, a second delay between the current node and a second successor node, and a remaining delay between the second successor node and the second node, wherein the first delay, the second delay, and the remaining delay include a worst case delay computation;
  comparing a sum of the first delay, the second delay, and the remaining delay to the transmission delay constraint; and
  in instances in which the sum is greater than the transmission delay constraint, adding a node identifier of the current node to the indication of nodes.

2. The method of claim 1, wherein the second path is determined in response to receiving a request from the second node for data from the first node.

3. The method of claim 2, wherein the request includes a transmission delay constraint, the second routing metric is a transmission delay, and the path segments for the second path are selected to include the path segments included in the plurality of first paths with transmission delays that satisfy the transmission delay constraint for the second path.

4. The method of claim 1, wherein the first routing metric is a cost associated with using a link of the plurality of links and the second routing metric is a transmission delay associated with using the link.

5. The method of claim 1, wherein the second path is determined in response to a sum of the second routing metric associated with the path segments of the plurality of first paths being less than a transmission delay constraint.

6. The method of claim 1, wherein the indication of nodes does not include all the nodes of the plurality of nodes included in the second path.

7. The method of claim 1, wherein the plurality of nodes represent one or more routers or one or more switches.

8. The method of claim 1, further comprising updating the network information in response to a new node being added to the plurality of nodes or a new link being added to the plurality of links.

9. A system comprising:
  one or more computer-readable storage media configured to store instructions; and
  one or more processors communicatively coupled to the one or more computer-readable storage media and configured to, in response to execution of the instructions, cause the system to perform operations, the operations comprising:
    obtaining network information of a network, the network information including:
      a network topology that includes a plurality of nodes and a plurality of links connecting the plurality of nodes, each of the plurality of links including a first routing metric and a second routing metric; and
      a plurality of first paths from each node of the plurality of nodes to all other nodes of the plurality of nodes along the plurality of links, the plurality of first paths determined based on the first routing metric;
    after obtaining the network information, determining a second path from a first node of the plurality of nodes to a second node of the plurality of nodes, the determining the second path including selecting path segments for the second path along the plurality of links based on the path segments being included in the plurality of first paths and based on the second routing metric of the plurality of links included in the path segments;
    obtaining, at the first node, an indication of nodes included in the second path, the indication of nodes including nodes of the plurality of nodes to constrain routing along the second path based on the first path metric,
    wherein determining the second path comprises:
      obtaining a transmission delay constraint and an input path from the plurality of first paths that satisfy the first routing metric;
      adding a first node identifier associated with the first node to the indication of nodes;
      traversing the input path from the first node to the second node adding one or more intermediate node identifiers to the indication of nodes, the one or more intermediate node identifiers comprising:
        a first intermediate node that includes a successor node, the successor node having multiple predecessor nodes wherein less than all paths from the first node to the second node, routed through the predecessor nodes, satisfy the transmission delay constraint; and
        a second intermediate node wherein a link of the plurality of links between a previous node and the second intermediate node is not included on any paths of the plurality of first paths; and adding a last node identifier associated with the second node to the indication of nodes; and wherein satisfying the transmission delay constraint comprises:

computing a first delay between the first node and a current node, a second delay between the current node and a second successor node, and a remaining delay between the second successor node and the second node, wherein the first delay, the second delay, and the remaining delay include a worst case delay computation;

comparing a sum of the first delay, the second delay, and the remaining delay to the transmission delay constraint; and in instances in which the sum is greater than the transmission delay constraint, adding a node identifier of the current node to the indication of nodes.

10. The system of claim 9, wherein the second path is determined in response to receiving a request from the second node for data from the first node.

11. The system of claim 10, wherein the request includes a transmission delay constraint, the second routing metric is a transmission delay, and the path segments for the second path are selected to include the path segments included in the plurality of first paths with transmission delays that satisfy the transmission delay constraint for the second path.

12. The system of claim 9, wherein the first routing metric is a cost associated with using a link of the plurality of links and the second routing metric is a transmission delay associated with using the link.

13. The system of claim 9, wherein the second path is determined in response to a sum of the second routing metric associated with the path segments of the plurality of first paths being less than a transmission delay constraint.

14. The system of claim 9, wherein the indication of nodes does not include all the nodes of the plurality of nodes included in the second path.

15. The system of claim 9, wherein the plurality of nodes represent one or more routers or one or more switches.

16. The system of claim 9, wherein the operations further comprise updating the network information in response to a new node being added to the plurality of nodes or a new link being added to the plurality of links.

* * * * *